US012654776B2

(12) United States Patent (10) Patent No.: US 12,654,776 B2
Kum et al. (45) Date of Patent: Jun. 16, 2026

(54) FRONT VEHICLE BODY FOR PROVIDING STRENGTH AGAINST FRONTAL COLLISION OF ELECTRIC VEHICLE

(71) Applicants: Hyundai Motor Company, Seoul (KR); Kia Corporation, Seoul (KR)

(72) Inventors: Dong-Il Kum, Whasung-Si (KR); Jang-Won Hong, Whasung-Si (KR); Kyung-Bum Kang, Whasung-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 314 days.

(21) Appl. No.: 18/381,505

(22) Filed: Oct. 18, 2023

(65) Prior Publication Data

US 2024/0375715 A1 Nov. 14, 2024

(30) Foreign Application Priority Data

May 9, 2023 (KR) ........................ 10-2023-0060112

(51) Int. Cl.
| | |
|---|---|
| *B62D 21/15* | (2006.01) |
| *B60K 1/04* | (2019.01) |
| *B62D 25/04* | (2006.01) |
| *B62D 25/08* | (2006.01) |
| *B62D 25/14* | (2006.01) |

(52) U.S. Cl.
CPC .............. *B62D 21/152* (2013.01); *B60K 1/04* (2013.01); *B62D 25/04* (2013.01); *B62D 25/082* (2013.01); *B62D 25/145* (2013.01)

(58) Field of Classification Search
CPC .... B62D 21/152; B62D 25/04; B62D 25/082; B62D 25/145; B62D 25/2045; B62D 25/2018; B62D 25/08; B60K 1/04; B60K 2001/0438; B60K 2001/0405; B60Y 2306/01; B60L 3/0015
See application file for complete search history.

(56) References Cited

U.S. PATENT DOCUMENTS 7,832,795 B2 * 11/2010 Yokoi ................ B62D 25/2018
                                             296/203.02
9,238,485 B2 * 1/2016 Atsumi ............. B62D 25/2045
9,540,047 B2 * 1/2017 Min ....................... B62D 25/14
9,776,671 B2 * 10/2017 Song .................... B62D 25/145
(Continued)

FOREIGN PATENT DOCUMENTS

JP       2008068826 A  *  3/2008
JP       2009248593 A  * 10/2009
(Continued)

OTHER PUBLICATIONS

JP-2009248593-A English Translation (Year: 2009).*
(Continued)

*Primary Examiner* — Michael T. Walsh
(74) *Attorney, Agent, or Firm* — MORGAN, LEWIS & BOCKIUS LLP

(57) ABSTRACT

According to a front vehicle body for providing strength against a frontal collision of an electric vehicle, locational characteristics and mounting characteristics of a high-voltage battery on a vehicle body platform for an electric vehicle are considered by connection structures of a dash upper side member, a dash tunnel reinforcement member, a dash cross member, and a dash cross side member.

18 Claims, 7 Drawing Sheets

(56)  References Cited

U.S. PATENT DOCUMENTS

2016/0001817 A1 * 1/2016 Atsumi ................. B62D 25/20
                                          296/193.07
2016/0090126 A1   3/2016 Min et al.

FOREIGN PATENT DOCUMENTS

| | | | | |
|---|---|---|---|---|
| JP | 2014043133 | A | * | 3/2014 |
| JP | 6090181 | B2 | * | 3/2017 |
| KR | 10-1534751 | B1 | | 7/2015 |
| WO | WO-2014162493 | A1 | * | 10/2014 ......... B62D 25/2045 |

OTHER PUBLICATIONS

JP-2008068826-A English Translation (Year: 2008).*
JP-2014043133-A English Translation (Year: 2014).*
WO-2014162493-A1 English Translation (Year: 2014).*
JP-6090181-B2 English Translation (Year: 2017).*

* cited by examiner

COLLISION
LOAD

FRONT

REAR

LEFT ←——→ RIGHT

<LOAD PATH DIVERSIFICATION PATH>

● BATTERY MOUNTING
   POINT P

CABIN SPACE PORTION

CENTER SIDE MEMBER CONNECTION PART A

<CROSS-SECTION A>

<BATTERY MOUNTING PART PROTECTION K>

LEFT ◄──► RIGHT

<CENTER SIDE MEMBER
CONNECTION PART A>

FRONT SIDE
MEMBER OVERLAP B

FIG. 5

FRONT VEHICLE BODY FOR PROVIDING STRENGTH AGAINST FRONTAL COLLISION OF ELECTRIC VEHICLE

CROSS-REFERENCE TO RELATED APPLICATION

The present application claims priority to Korean Patent Application No. 10-2023-0060112, filed on May 9, 2023, the entire contents of which is incorporated herein for all purposes by this reference.

BACKGROUND OF THE PRESENT DISCLOSURE

Field of the Present Disclosure

The present disclosure relates to a front vehicle body structure for an electric vehicle, and more particularly, to a front vehicle body for providing strength against a frontal collision of an electric vehicle, which is capable of enhancing protectivity and effectively preventing a pushback of a vehicle body in consideration of locational characteristics and mounting characteristics of a high-voltage battery in the vehicle body.

DESCRIPTION OF RELATED ART

In general, a front vehicle body structure of a vehicle is configured so that a collision member is located along a lower portion of a vehicle body from a front side of the vehicle.

For example, an internal combustion engine vehicle has a vehicle body structure in which a member-type collision member is provided at a lower side of the vehicle body, and a deep and wide tunnel part structurally penetrates a middle portion of the vehicle body.

However, the vehicle body structure, in which the deep and wide tunnel part penetrates the middle portion of the vehicle body, is not efficient for an electric vehicle in which a battery module is installed at a lower side of a vehicle body, and the vehicle body is very low or has a flat shape so that almost tunnel is not formed.

This is because the battery module is mounted at the lower side of the vehicle body of the electric vehicle and thus, it is spatially advantageous to dispose a collision member at an upper side of the vehicle body, and in particular, the battery, which is the most important and heavy component in the electric vehicle, needs to be safely protected without being damaged in the event of a collision.

Furthermore, a special structure is required to robustly mount the battery which is the most important component and one of the heavy components in the electric vehicle. However, the vehicle body structure of the internal combustion engine vehicle cannot be optimized for a battery mounting structure required for an electric vehicle.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a front vehicle body for providing strength against a frontal collision of an electric vehicle, which is configured for effectively preventing a pushback of the vehicle body and enhancing protectivity for battery safety by maximizing collision performance in consideration of locational characteristics and mounting characteristics of a high-voltage battery on a vehicle body platform for an electric vehicle while providing a structure for diversifying a load path for frontal collision energy dispersion, a cross-sectional structure for coping with a collision load on an overlap lateral wall surface, and a structure for protecting a battery mounting portion by minimizing the deformation of the battery mounting portion.

To achieve the above-mentioned object, the present disclosure provides a front vehicle body for providing strength against a frontal collision of an electric vehicle, the front vehicle body including: a seat cross member coupled in a width direction of a dash panel and configured to define a cabin space area at a distance from a dash cross member connected to an A-pillar panel: a dash upper side member and a center side member aligned in a row with a front side member to which a collision load is introduced in the cabin space area, the dash upper side member and the center side member being connected to the dash cross member and the seat cross member: a dash tunnel reinforcement member and a center tunnel reinforcement member disposed at a distance from the dash upper side member and the center side member in the cabin space area and connected to the dash cross member and the seat cross member: a dash cross side member disposed on the dash upper side member and connected to a side sill member connected to the A-pillar panel; and a dash cross battery mounting member configured to connect the dash upper side member and the dash tunnel reinforcement member between the dash upper side member and the dash tunnel reinforcement member and configured as a battery mounting portion.

In the exemplary embodiment of the present disclosure, the collision load may be dispersed to any one of a load path ① through which the collision load is transmitted to the dash upper side member and the center side member, a load path ② through which the collision load is transmitted to the dash cross member and the A-pillar panel, a load path ③ through which the collision load is transmitted to the dash cross side member and the side sill member, a load path ④ through which the collision load is transmitted to a middle portion of the dash cross member, and a load path ⑤ through which the collision load is transmitted to the dash tunnel reinforcement member and the center tunnel reinforcement member.

In the exemplary embodiment of the present disclosure, the dash upper side member may be attached to the dash cross member and overlap the center side member to define a center side member connection portion.

In the exemplary embodiment of the present disclosure, the dash upper side member may be located in a front side member overlap section, and the front side member overlap section may be defined below the dash upper side member by the front side member connected to the dash panel.

In the exemplary embodiment of the present disclosure, the dash tunnel reinforcement member may define a member overlap section with a lateral wall surface overlapping the dash upper side member and define a member connection part section with a lateral wall surface overlapping the center tunnel reinforcement member.

In the exemplary embodiment of the present disclosure, the dash cross member may be connected to the A-pillar panel with a pillar connection portion, connected to the dash tunnel reinforcement member with a dash tunnel upper end portion connection portion, and connected to the dash upper side member with a dash upper-upper end connection portion.

In the exemplary embodiment of the present disclosure, the dash tunnel upper end portion connection portion may be defined as the dash cross member passes over an upper end portion of the dash tunnel reinforcement member, and the dash upper-upper end connection portion may be defined as the dash cross member passes over an upper end portion of the dash upper side member.

In the exemplary embodiment of the present disclosure, the dash cross side member may be connected to the dash cross member with a member lower end connection portion, connected to the side sill member with a side sill connection portion, and connected to the dash upper side member with a side sidewall connection portion.

In the exemplary embodiment of the present disclosure, the member lower end connection portion may be defined as the dash cross member passes over an upper end portion of the dash cross side member.

In the exemplary embodiment of the present disclosure, the dash cross battery mounting member may be connected to the dash upper side member with a member first connection portion and connected to the dash tunnel reinforcement member with a member second connection portion, the member first connection portion may be located on a sidewall of the dash upper side member, and the member second connection portion may be located on a sidewall of the dash tunnel reinforcement member.

In the exemplary embodiment of the present disclosure, a battery mounting reinforcement member may be coupled to the dash cross battery mounting member, and the dash cross battery mounting member and the battery mounting reinforcement member may define a battery mounting point.

In the exemplary embodiment of the present disclosure, the battery mounting portion may be surrounded by a battery mounting part protection structure, and the battery mounting part protection structure may be defined by the dash upper side member, the dash tunnel reinforcement member, and the dash cross battery mounting member.

In the exemplary embodiment of the present disclosure, the center side member, the center tunnel reinforcement member, and the seat cross member may be connected to one another.

In the exemplary embodiment of the present disclosure, the front side member may be provided to traverse an external engine compartment and connected to a front side of the dash upper side member.

In the exemplary embodiment of the present disclosure, the dash tunnel reinforcement member and the center tunnel reinforcement member may be located at a middle portion of the dash panel and divide a dash panel width into a left region and a right region, and the dash upper side member, the dash cross side member, a dash cross battery mounting member, the front side member, and the center side member may be provided as dash panel left constituent components in the left region and dash panel right constituent components in the right region.

The front vehicle body for providing strength against a frontal collision of an electric vehicle of the present disclosure implements the following operations and effects of optimizing the vehicle body structure for coping with a frontal collision and enhancing battery protection in the event of a frontal collision.

For example, the optimization of the vehicle body structure for coping with a frontal collision ensures the safety of the vehicle body and the passenger by effectively absorbing and dispersing collision energy in the event of a frontal collision, and reduces a weight of the vehicle body by diversifying the load paths and efficiently supporting the load, improving energy efficiency of the electric vehicle and increasing the traveling distance.

Furthermore, the reinforcement of the battery protection in the event of a frontal collision minimizes deformation of and damage to the battery in the event of a frontal collision by use of the vehicle body structure including the collision reinforcement members configured for minimizing the deformation around the battery mounting portion, and improves the lifespan and safety of the battery by effectively absorbing and dispersing the frontal collision energy, improving the overall performance and durability of the electric vehicle.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

BRIEF DESCRIPTION OF THE DRAWINGS

FIG. 2 is a view exemplarily illustrating a state in which a load path diversification route for the front vehicle body configured for providing strength against a frontal collision according to an exemplary embodiment of the present disclosure is provided.

FIG. 5 is a view exemplarily illustrating a dash tunnel reinforcement structure of the front vehicle body according to an exemplary embodiment of the present disclosure.

Figure 1:
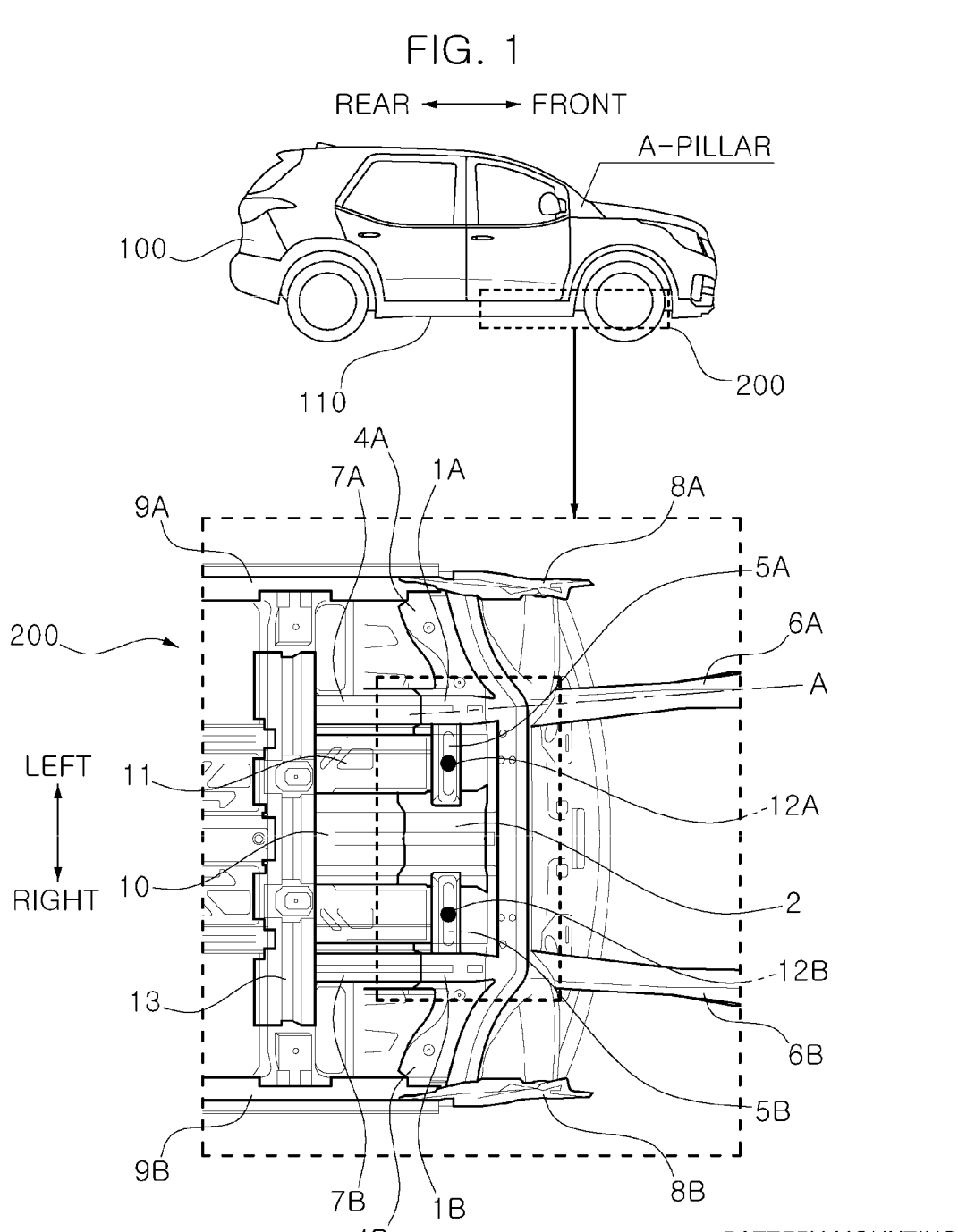
FIG. 1 is a view exemplarily illustrating a structure of a front vehicle body for providing strength against a frontal collision inputted to an electric vehicle according to an exemplary embodiment of the present disclosure.

It may be understood that the appended drawings are not necessarily to scale, presenting a somewhat simplified representation of various features illustrative of the basic principles of the present disclosure. The predetermined design features of the present disclosure as included herein, including, for example, specific dimensions, orientations, locations, and shapes will be determined in part by the particularly intended application and use environment.

In the figures, reference numbers refer to the same or equivalent portions of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, various embodiments of the present disclosure will be described in detail with reference to the exemplary accompanying drawings, and because these embodiments, as examples, may be implemented in various different forms by those skilled in the art to which the present disclosure pertains, they are not limited to the exemplary embodiments described herein.

Hereinafter, various embodiments of the present disclosure will be described in detail with reference to the accompanying exemplified drawings. Because the exemplary embodiments are only examples and may be implemented in various different forms by those skilled in the art to which the present disclosure pertains, the present disclosure is not limited to the exemplary embodiments described herein.

With reference to FIG. 1, a front vehicle body 200 for providing strength against a frontal collision, which forms a floor panel 110 of an electric vehicle 100, is provided, by welding, on a dash panel 11 that defines a vehicle width. The front vehicle body 200 includes a dash upper side member 1, a dash tunnel reinforcement member 2, a dash cross member 3, a dash cross side member 4, a dash cross battery mounting member 5, a front side member 6, a center side member 7, an A-pillar panel 8, a side sill member 9, a center tunnel reinforcement member 10, a battery mounting reinforcement member 12, and a seat cross member 13.

Figure 2:
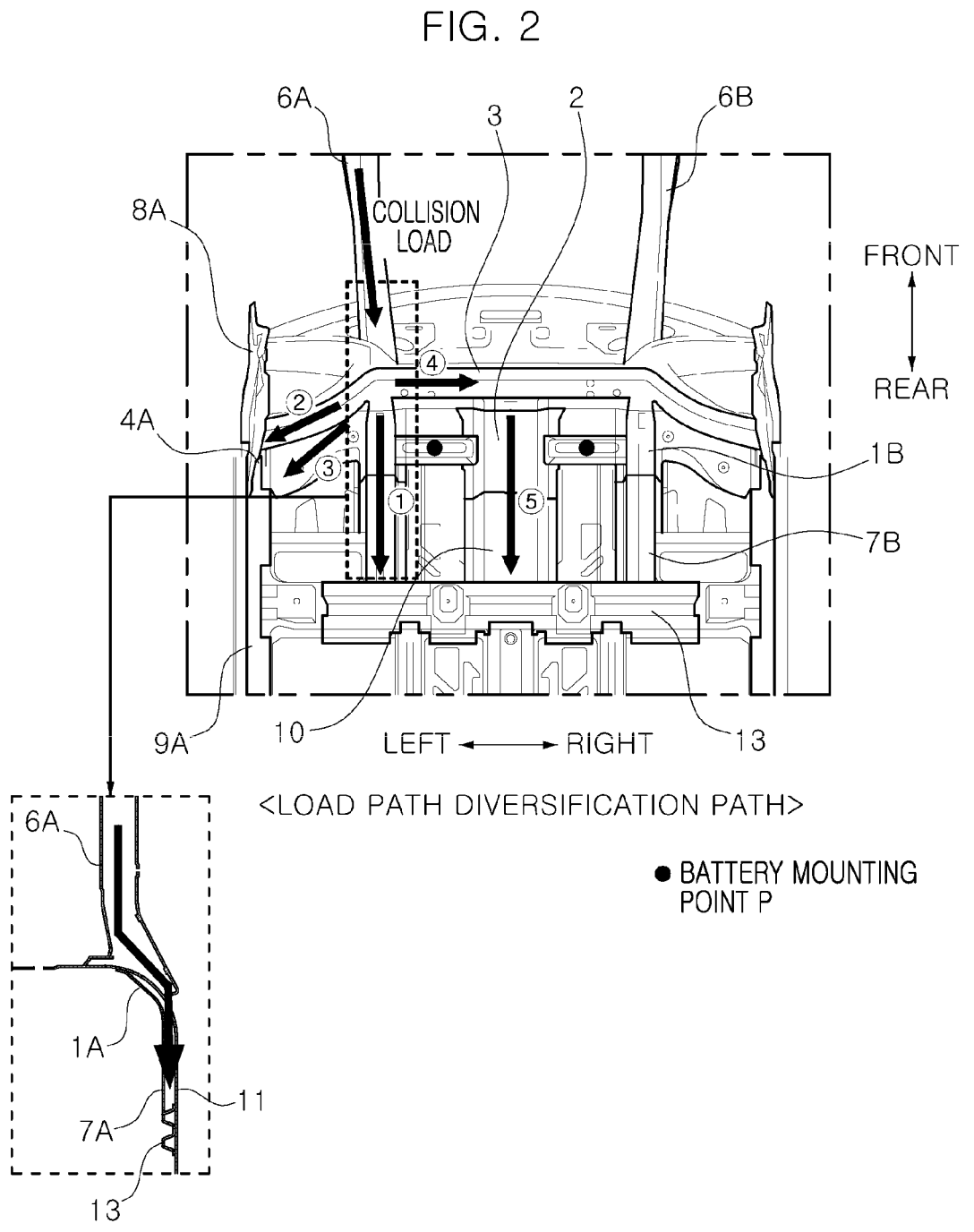

The dash cross member 3 is arranged and fixed to include a length equal in size to a width of the dash panel 11 and defines a boundary with a cabin space area (see FIG. 2). The seat cross member 13 is arranged and fixed rearward of the dash cross member 3, includes a length shorter in size than the width of the dash panel 11, and is located in the cabin space area (see FIG. 2). The dash tunnel reinforcement member 2 is located at a middle position based on the width of the dash panel 11 and connected to the center tunnel reinforcement member 10 from the dash cross member 3. The center tunnel reinforcement member 10 is located at the middle position based on the width of the dash panel 11 and connected to the dash tunnel reinforcement member 2 from the seat cross member 13.

Among the constituent elements, the dash upper side member 1, the dash tunnel reinforcement member 2, the dash cross member 3, the dash cross side member 4, and the dash cross battery mounting member 5 are provided in the cabin space area based on the cabin space area (see FIG. 2) of the dash panel 11.

For example, the dash upper side member 1 includes a member shape including a cross-sectional area of a lateral wall surface and is aligned in a row to be connected to the front side member 6. The dash tunnel reinforcement member 2 includes a member shape including a cross-sectional area of a lateral wall surface and is connected to the center tunnel reinforcement member 10 in a row. The dash cross member 3 includes a connection structure that covers the dash upper side member 1 and the dash tunnel reinforcement member 2 and extends to the A-pillar panels 8 located at the left and right sides. The dash cross side member 4 includes a connection structure connected to the dash upper side member 1 while including an H-surface junction and connected to the side sill members 9 located at the left and right sides.

The dash upper side member 1, the dash tunnel reinforcement member 2, the dash cross member 3, and the dash cross side member 4 are each made of a material with strength of 1470 series or more.

For example, the dash cross battery mounting member 5 includes a connection structure connected to the dash upper side member 1 and the dash tunnel reinforcement member 2. The dash cross battery mounting member 5 provides one or more battery mounting points P for mounting a non-illustrated voltage battery, which is a power source of the vehicle 100, at a lower end portion thereof. In the instant case, the battery mounting points P include left and right battery mounting points P.

The dash cross battery mounting member 5 includes a material including strength of high-tension steel.

Furthermore, among the constituent elements, the front side member 6 is connected to the dash upper side member 1. The center side member 7 includes a member shape including a cross-sectional area of a lateral wall surface and is connected to the dash upper side member 1 and the seat cross member 13. The A-pillar panel 8 is connected to the dash cross member 3. The side sill member 9 is connected to the dash cross side member 4. The center tunnel reinforcement member 10 is connected to the tunnel reinforcement member 2 and the seat cross member 13. The battery mounting reinforcement member 12 is attached to the dash cross battery mounting member 5. The seat cross member 13 is connected to the center side member 7 and the center tunnel reinforcement member 10.

For example, the front side member 6 is provided to traverse an external engine compartment of the electric vehicle 100 and connected to a front side of the dash upper side member 1, forming a path through which a collision load (see FIG. 3) enters in the event of a frontal collision.

For example, the center side member 7 is arranged rearward of the dash upper side member 1 in a row and connected to the seat cross member 13. The A-pillar panels 8 are connected to the left and right sides of the dash cross member 3. The side sill members 9 are connected to the left and right sides of the dash cross side member 4.

For example, the center tunnel reinforcement member 10 is arranged rearward of the dash tunnel reinforcement member 2 in a row and connected to the seat cross member 13.

For example, the battery mounting reinforcement member 12 is located at a lower end portion of the dash cross battery mounting member 5 and reinforces rigidity related to the battery mounting point P. The battery mounting reinforcement member 12 has fastening holes (see FIG. 8) for the battery mounting points P.

For example, the seat cross member 13 is connected to the center side member 7 and the center tunnel reinforcement member 10 while being located rearward of the dash cross member 3.

In the front vehicle body 200 for providing strength against a frontal collision, in view of a layout, the center tunnel reinforcement member 10 connects middle sections of the dash cross member 3 and the seat cross member 13 so that the width of the dash panel 11 is divided into a left region and a right region. Therefore, dash panel left constituent components are provided in the left region, and dash panel right constituent components are provided in the right region.

For example, the dash panel left constituent components include a left dash upper side member 1A of the dash upper side member 1, a left dash cross side member 4A of the dash cross side member 4, a left dash cross battery mounting member 5A of the dash cross battery mounting member 5, a left front side member 6A of the front side member 6, a left center side member 7A of the center side member 7, a left A-pillar panel 8A of the A-pillar panel 8, a left side sill member 9A of the side sill member 9, and a left battery mounting reinforcement member 12A of the battery mounting reinforcement member 12.

For example, the dash panel right constituent components include a right dash upper side member 1B of the dash upper side member 1, a right dash cross side member 4B of the dash cross side member 4, a right dash cross battery mounting member 5B of the dash cross battery mounting member 5, a right front side member 6B of the front side member 6, a right center side member 7B of the center side member 7, a right A-pillar panel 8B of the A-pillar panel 8, a right side sill member 9B of the side sill member 9, and a right battery mounting reinforcement member 12B of the battery mounting reinforcement member 12B.

Therefore, the left and right dash upper side members 1A and 1B, the left and right dash cross side members 4A and 4B, the left and right dash cross battery mounting members 5A and 5B, the left and right front side members 6A and 6B, the left and right center side members 7A and 7B, the left and right A-pillar panels 8A and 8B, the left and right sides sill members 9A and 9B, and the left and right battery mounting reinforcement members 12A and 12B are symmetrically disposed at the left and right sides with respect to the center tunnel reinforcement member 10 and identical in shapes, structures, operations, and effects.

The left and right front side members 6A and 6B are arranged at an interval and provided to traverse the external engine compartment of the vehicle 100 to support a load applied by an engine and the like.

Figure 3:
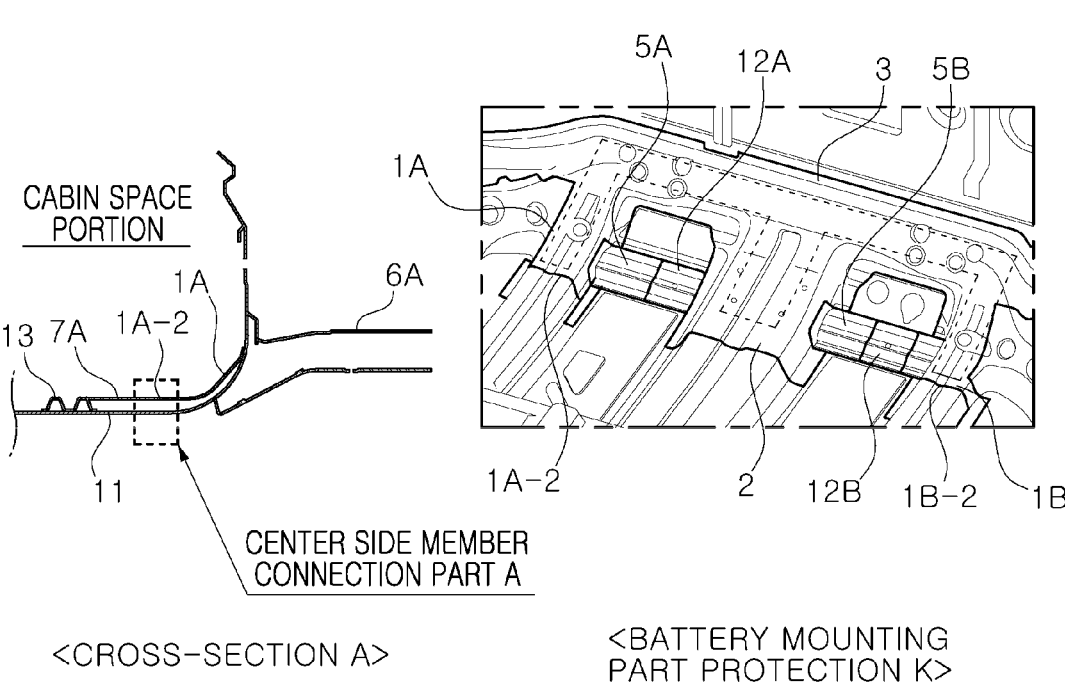
FIG. 3 is a view exemplarily illustrating a cross-sectional structure for coping with a collision load of a front vehicle body and a structure for protecting a battery mounting portion according to an exemplary embodiment of the present disclosure.

Meanwhile, FIG. 2 and FIG. 3 exemplarily illustrate a structural feature of the front vehicle body 200 for providing strength against a frontal collision.

With reference to FIG. 2, when a collision load is inputted through the left front side member 6A of the front side member 6 in the event of a frontal collision, the front vehicle body 200 for providing strength against a frontal collision may minimize an influence of the collision load on the vehicle body by dispersing the collision load to a load path ①, a load path ②, a load path ③, a load path ④, and a load path ⑤.

For example, the load path ① is a path through which the highest load is inputted or transmitted to the left dash upper side member 1A and the left center side member 7A. The load path ② is a path through which a load is inputted or transmitted to the left A-pillar panel 8A through a left portion of the dash cross member 3. The load path ③ is a path through which a load is inputted or transmitted to the left side sill member 9A through the left dash cross side member 4A. The load path ④ is a path through which a load is inputted or transmitted to a middle portion of the dash cross member 3. The load path ⑤ is a path through which a load is inputted or transmitted to the dash tunnel reinforcement member 2 and the center tunnel reinforcement member 10 through the middle portion of the dash cross member 3.

Therefore, even in case that the collision load is inputted or transmitted through the right front side member 6B, the load is dispersed to the load paths ①, ②, ③, ④, and ⑤ in the same manner. The vehicle body structure for coping with a collision and the battery mounting structure will be described below.

For example, the vehicle body structure for coping with a collision is configured by the left dash upper side member 1A, the right dash upper side member 1B, the dash tunnel reinforcement member 2, the dash cross member 3, the left dash cross side member 4A, the right dash cross side member 4B, the left dash cross battery mounting member 5A, and the right dash cross battery mounting member 5B.

For example, the battery mounting structure is configured by locating the left battery mounting reinforcement member 12A and the right battery mounting reinforcement member 12B below the left dash cross battery mounting member 5A and the right dash cross battery mounting member 5B.

Therefore, the left dash upper side member 1A, the right dash upper side member 1B, the left dash cross side member 4A, and the right dash cross side member 4B need to be configured as separate components instead of being integrated. Furthermore, the dash cross member 3 needs to be connected to the left dash upper side member 1A, the right dash upper side member 1B, the dash tunnel reinforcement member 2, the left dash cross side member 4A, and the right dash cross side member 4B.

Furthermore, the left dash cross battery mounting member 5A and the right dash cross battery mounting member 5B need to be connected to the left dash upper side member 1A, the right dash upper side member 1B, and the dash tunnel reinforcement member 2 and need to include the left battery mounting reinforcement member 12A and the right battery mounting reinforcement member 12B as battery mounting portions below the above-mentioned members 1A, 1B, 2, 5A, and 5B.

With reference to cross-section A in FIG. 3, the left and right dash upper side members 1A and 1B respectively include the left and right dash upper side matching portions 1A-2 and 1B-2. The left and right dash upper side matching portions 1A-2 and 1B-2 are connected to overlap the left and right center side members 7A and 7B so that an overlap section of a center side member connection portion A is defined in an L/H direction thereof. In the instant case, the L/H direction is defined in a three-axis coordinate system including T, L, and H. L is defined as a leftward/rightward direction, and H is defined as an upward/downward direction thereof.

Therefore, the center side member connection portion A allows the left and right dash upper side members 1A and 1B and the left and right center side members 7A and 7B, which include the lateral wall surfaces located above the left and right front side members 6A and 6B, to be configured without a cross-section loss.

Therefore, the left and right dash upper side members 1A and 1B, which are disposed in the load path ①, which is an important path for collision performance and receives highest load in the event of a frontal collision, may sufficiently receive the load from the left and right front side members 6A and 6B.

With reference to the battery mounting part protection structure K in FIG. 3, the battery mounting part protection structure K forms the left battery mounting reinforcement member 12A and the right battery mounting reinforcement member 12B as the battery mounting portion at lower end portions of the left dash cross battery mounting member 5A and the right dash cross battery mounting member 5B disposed with the left dash upper side member 1A, the right dash upper side member 1B, and the dash tunnel reinforcement member 2 interposed therebetween.

Therefore, the battery mounting part protection structure K is configured so that the battery mounting portions are surrounded by the collision reinforcement members 1A, 1B, 2, 5A, 5B, 12A, and 12B to minimize the deformation, minimizing the deformation of the mounting portions and ensuring the battery stability.

Meanwhile, FIG. 4, FIG. 5, FIG. 6, FIG. 7 and FIG. 8 exemplarily illustrate a center side member connection portion A, a front side member overlap B, a member overlap C, a member connection portion D, a pillar connection portion E, a dash tunnel upper end portion connection portion F, a dash upper-upper end connection portion G, a member lower end connection portion H, a side sill connection portion I, a side sidewall connection portion J, a member first connection portion M and a member second connection portion N that the constituent components of the front vehicle body 200 for providing strength against a frontal collision have.

Figure 4:
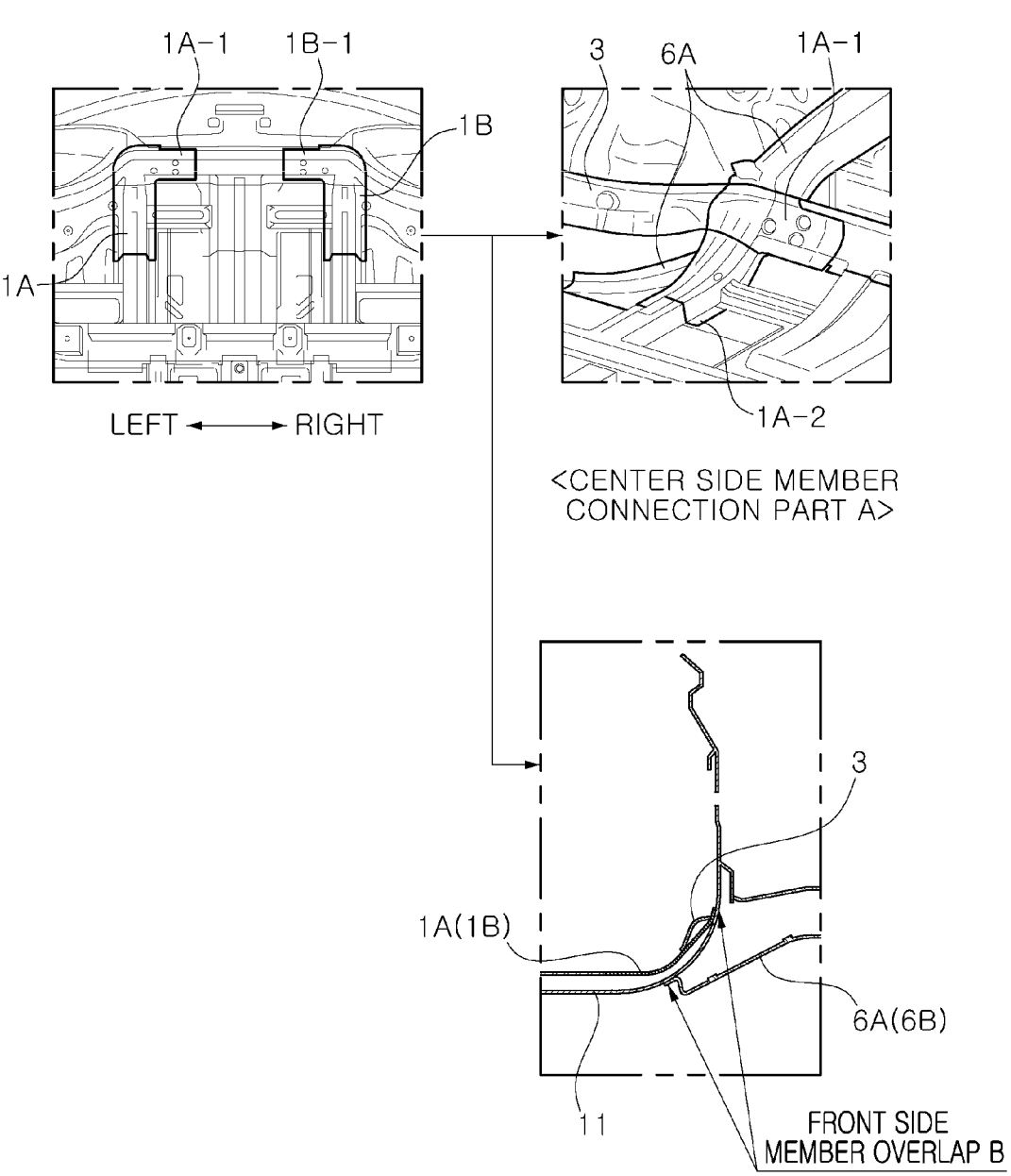
FIG. 4 is a view exemplarily illustrating a dash upper side member structure of the front vehicle body according to an exemplary embodiment of the present disclosure.

With reference to FIG. 4, the left dash upper side member 1A includes a left dash upper side extension portion 1A-1 and a left dash upper side matching portion 1A-2 (see FIG. 3), and the right dash upper side member 1B includes a right dash upper side extension portion 1B-1 and a right dash upper side matching portion 1B-2 (see FIG. 3).

For example, the left dash upper side extension portion 1A-1 and the right dash upper side extension portion 1B-1 are respectively attached to the dash cross member 3 to reinforce the rigidity. The left dash upper side matching portion 1A-2 and the right dash upper side matching portion 1B-2 respectively overlap the left and right center side members 7A and 7B to be defined as the center side member connection portion A.

Furthermore, the left and right front side members 6A and 6B connected to the lower sides of the left and right dash upper side members 1A and 1B may each include a "☐" cross-sectional structure. The upper and lower end portion extension portions of the "☐" cross-section define a front side member overlap section B that surrounds the dash panel 11 below the left and right dash upper side members 1A and 1B and the dash cross member 3.

Therefore, the left and right dash upper side members 1A and 1B respectively define straight alignment and matching portion overlaps with the left and right front side members 6A and 6B. The front cross-section upper end portions, which are the left and right dash upper side extension portions 1A-1 and 1B-1, are connected to the dash cross member 3. The rear portions, which are the left and right dash upper side matching portions 1A-2 and 1B-2, are connected to the left and right center side members 7A and 7B.

Figure 5:
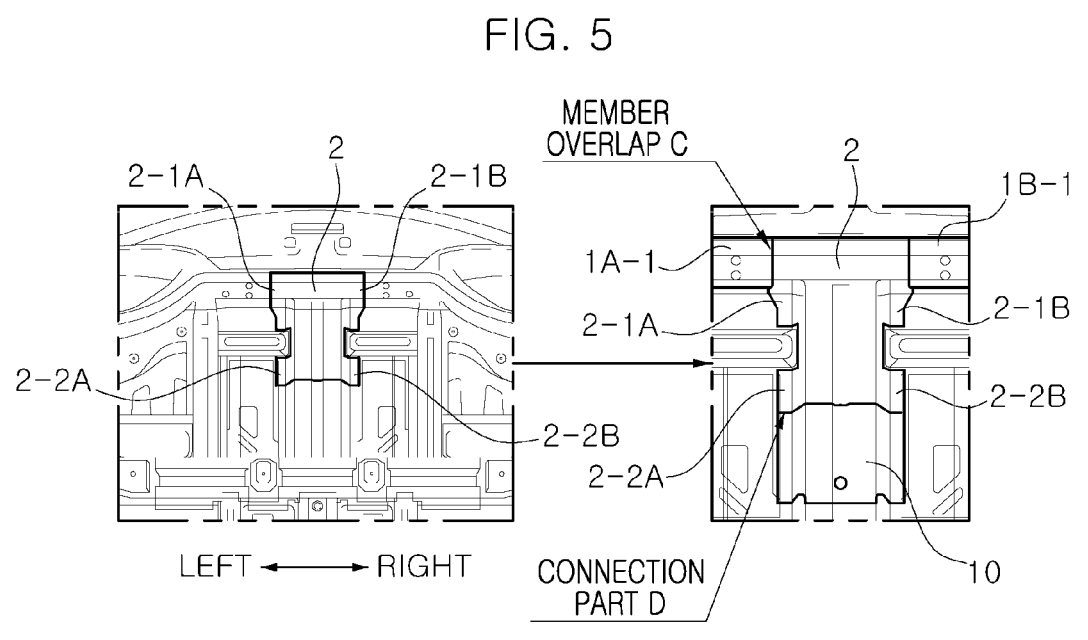

With reference to FIG. 5, the dash tunnel reinforcement member 2 is configured as a member type including lateral wall surfaces including a left dash tunnel overlap flange 2-1A, a right dash tunnel overlap flange 2-1B, a left dash tunnel connection flange 2-2A, and a right dash tunnel connection flange 2-2B above front portions at opposite sides thereof. The dash tunnel reinforcement member 2 defines the member overlap section C and the member connection part section D.

Therefore, the dash tunnel reinforcement member 2 includes an extending flange, defines the member overlap section C and the member connection part section D, and is joined to the dash upper side member 1.

To the present end, the dash tunnel reinforcement member 2 overlaps the left and right dash upper side members 1A and 1B by matching of the left and right sides sidewalls with the left and right dash tunnel overlap flanges 2-1A and 2-1B and is connected to the center tunnel reinforcement member 10 with the left and right dash tunnel connection flange 2-2A and 2-2B at the rear side thereof.

Figure 6:
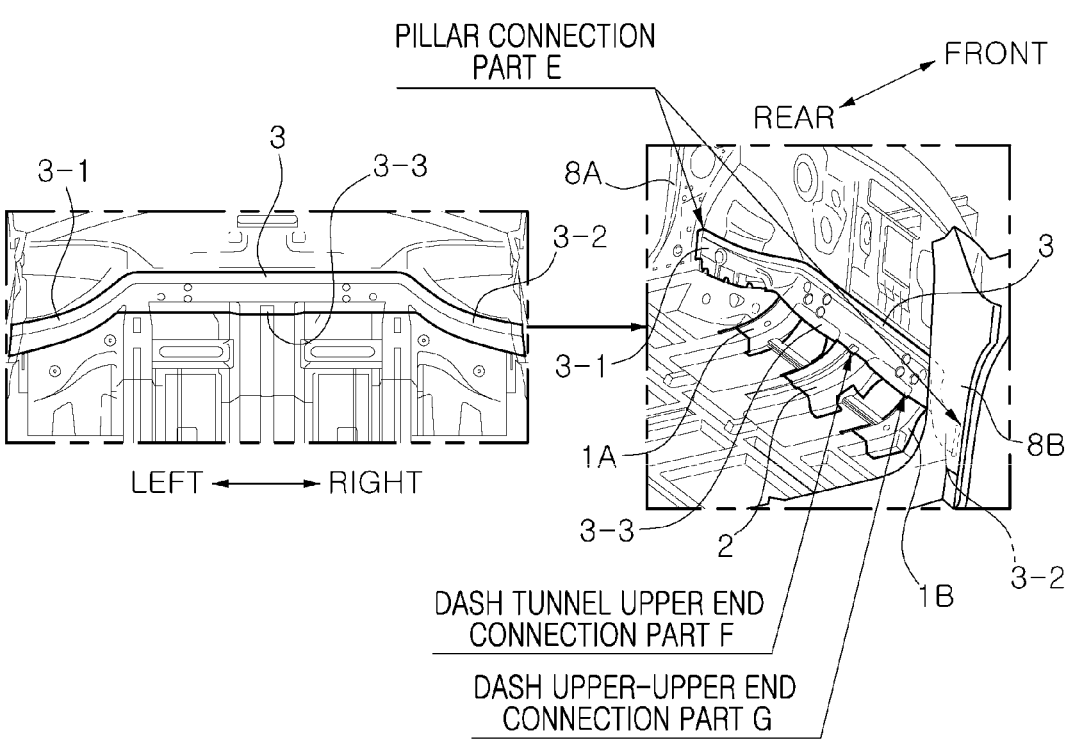
FIG. 6 is a dash cross member structure of the front vehicle body according to an exemplary embodiment of the present disclosure.

With reference to FIG. 6, the dash cross member 3 includes a first dash cross extension portion 3-1 connected to a left side thereof, a second dash cross extension portion 3-2 connected to a right side thereof, and a third dash cross extension portion 3-3 integrated with the first and second dash cross extension portions 3-1 and 3-2 and configured to define a lower structure thereof.

Therefore, the first and second dash cross extension portions 3-1 and 3-2 respectively define pillar connection portions E connected to the left and right A-pillar panels 8A and 8B at the left and right sides. The third dash cross extension portion 3-3 defines a dash tunnel upper end portion connection portion F connected to the dash tunnel reinforcement member 2 at the middle portion thereof and defines a dash upper-upper end connection portion G connected to each of the left and right dash upper side members 1A and 1B.

To the present end, the dash cross member 3 needs to be connected as an integrated member including the same cross-section as the left and right front side members 6A and 6B, needs to be connected to the members 1A and 1B while passing over the upper end portions of the left and right dash upper side members 1A and 1B, and needs to be connected while passing over the upper end portion of the dash tunnel reinforcement member 2.

Figure 7:
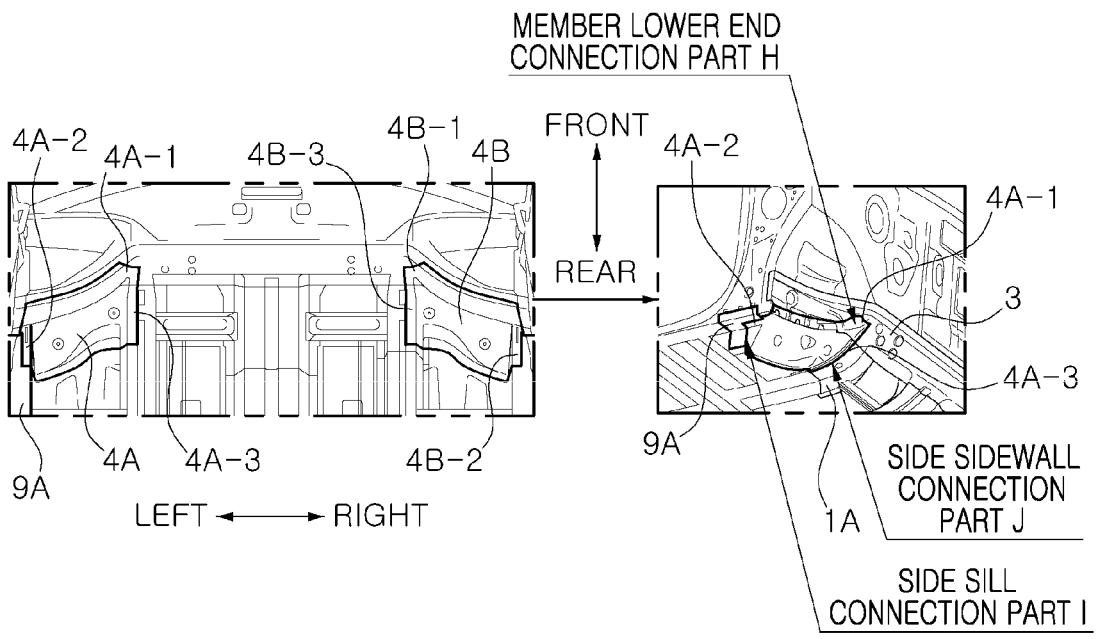
FIG. 7 is a view exemplarily illustrating a dash cross side member structure of the front vehicle body according to an exemplary embodiment of the present disclosure.

With reference to FIG. 7, the left dash cross side member 4A has first, second, and third left dash cross side flanges 4A-1, 4A-2, and 4A-3, and the right dash cross side member 4B has first, second, and third right dash cross side flanges 4B-1, 4B-2, and 4B-3.

Therefore, the member lower end connection portion H is defined as the dash cross member 3 overlaps and passes over the upper end portions of the first left dash cross side flange 4A-1 and the first right dash cross side flange 4B-1.

Furthermore, the side sill connection portion I is defined as the second left dash cross side flange 4A-2 is attached to and overlaps the left side sill member 9A, and the second right dash cross side flange 4B-2 is attached to and overlaps the right side sill member 9B.

Furthermore, the side sidewall connection portion J is defined as the third left dash cross side flange 4A-3 is attached to and overlaps the left dash upper side member 1A, and the third right dash cross side flange 4B-3 is attached to and overlaps the right dash upper side member 1B.

Therefore, the left and right dash cross side members 4A and 4B are respectively connected to the lower end portions of the dash cross member with the member lower end connection portion H, connected to a side sill extension with the side sidewall connection portion J, and connected to a dash upper side member sidewall with the side sidewall connection portion J.

Figure 8:
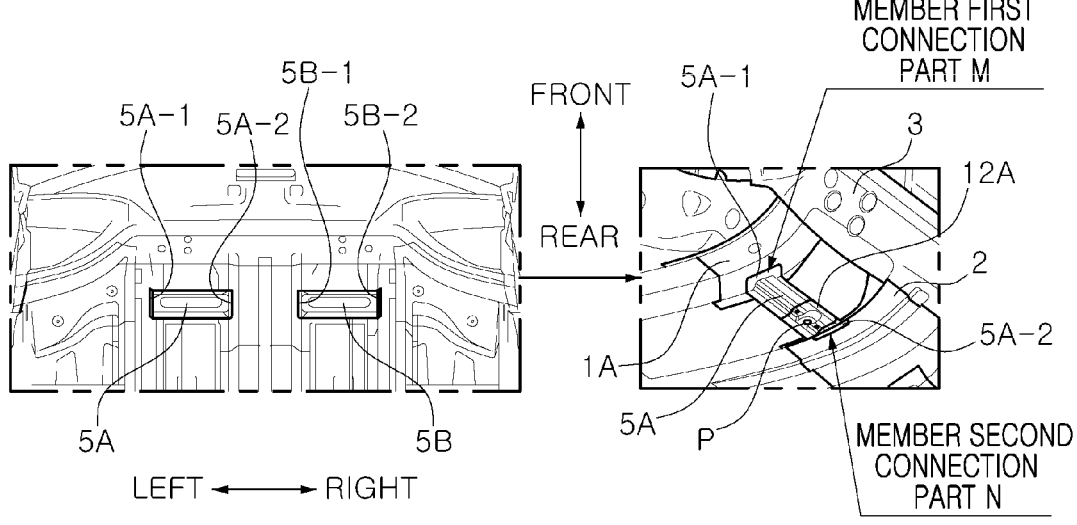
FIG. 8 is a view exemplarily illustrating a dash cross battery mounting member structure of the front vehicle body for providing strength against a frontal collision of an electric vehicle according to an exemplary embodiment of the present disclosure.

With reference to FIG. 8, the left dash cross battery mounting member 5A has first and second left dash cross battery mounting flanges 5A-1 and 5A-2, and the right dash cross battery mounting member 5B has first and second right dash cross battery mounting flanges 5B-1 and 5B-2.

Therefore, the member first connection portion M is defined as the first left dash cross battery mounting flange 5A-1 is attached to and overlaps the left dash upper side member 1A, and the first right dash cross battery mounting flange 5B-1 is attached to and overlaps the right dash upper side member 1B.

Furthermore, the member second connection portion N is defined as the second left dash cross battery mounting flange 5A-2 and the second right dash cross battery mounting flange 5B-2 are respectively attached to and overlap left and right sidewalls of the dash tunnel reinforcement member 2.

Therefore, the left and right dash cross battery mounting members 5A and 5B are respectively connected to dash upper side member sidewalls with the member first connection portion M and connected to dash tunnel reinforcement member sidewalls with the member second connection portion N.

The left and right dash cross battery mounting members 5A and 5B respectively define the battery mounting points P so that the battery mounting components are located at the lower end portion of the dash cross battery mounting member. The battery mounting points P include the left and right battery mounting points P so that the left and right battery mounting reinforcement members 12A and 12B may be respectively attached to reinforce the battery mounting rigidity.

As described above, according to the front vehicle body 200 for providing strength against a frontal collision of the electric vehicle 100 According to the exemplary embodiment of the present disclosure, the locational characteristics and the mounting characteristics of the high-voltage battery on the vehicle body platform for an electric vehicle are considered by the connection structures of the dash upper side member 1, the dash tunnel reinforcement member 2, the dash cross member 3, and the dash cross side member 4. Furthermore, the collision performance may be maximized by the load path diversification structure including the load path ① of the first load transmission members 1 and 7, the load path ② of the second load transmission members 3 and 8, the load path ③ of the third load transmission members 4 and 9, the load path ④ of the fourth load transmission member 3, and the load path ⑤ of the fifth load transmission members 2 and 10 that disperse a collision load entering the front side member 6 in the event of a frontal collision. Therefore, it is possible to reinforce the cross-sectional structure for coping with a collision load of the overlap members 1, 6, and 11, the battery mounting part protection structure K of the battery protection members 1, 2, 3, and 5, and the protectivity for the battery safety. Furthermore, it is possible to effectively prevent the pushback of the vehicle body.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes all three cases such as "A", "B", and "A and B".

In the present specification, unless stated otherwise, a singular expression includes a plural expression unless the context clearly indicates otherwise.

In exemplary embodiments of the present disclosure, "at least one of A and B" may refer to "at least one of A or B"

or "at least one of combinations of at least one of A and B". Furthermore, "one or more of A and B" may refer to "one or more of A or B" or "one or more of combinations of one or more of A and B".

In the exemplary embodiment of the present disclosure, it should be understood that a term such as "include" or "have" is directed to designate that the features, numbers, steps, operations, elements, parts, or combinations thereof described in the specification are present, and does not preclude the possibility of addition or presence of one or more other features, numbers, steps, operations, elements, parts, or combinations thereof.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A front vehicle body for providing strength against a frontal collision of a vehicle, the front vehicle body comprising:
   a dash cross side member connected to a side sill member from a dash upper side member aligned in a row with a front side member to which a collision load is inputted;
   a center side member connected to a seat cross member and aligned with the dash upper side member that receives the collision load from the front side member; and
   a dash tunnel reinforcement member and a center tunnel reinforcement member connected to a dash cross member and the seat cross member at a distance from the dash upper side member and the center side member.

2. The front vehicle body of claim 1, wherein the collision load is dispersed to any one of a first load path through which the collision load is transmitted to the dash upper side member and the center side member, a second load path through which the collision load is transmitted to the dash cross member and an A-pillar panel, a third load path through which the collision load is transmitted to the dash cross side member and the side sill member, a fourth load path through which the collision load is transmitted to a middle portion of the dash cross member, and a fifth load path through which the collision load is transmitted to the dash tunnel reinforcement member and the center tunnel reinforcement member.

3. The front vehicle body of claim 1, wherein the dash upper side member is attached to the dash cross member and overlaps the center side member to define a center side member connection portion.

4. The front vehicle body of claim 1, wherein the dash upper side member is located in a front side member overlap section, and the front side member overlap section is defined below the dash upper side member by the front side member connected to a dash panel.

5. The front vehicle body of claim 1, wherein the dash tunnel reinforcement member defines a member overlap section with a lateral wall surface overlapping the dash upper side member and defines a member connection part section with a lateral wall surface overlapping the center tunnel reinforcement member.

6. The front vehicle body of claim 1, wherein the dash cross member is connected to an A-pillar panel with a pillar connection portion, connected to the dash tunnel reinforcement member with a dash tunnel upper end portion connection portion, and connected to the dash upper side member with a dash upper-upper end connection portion.

7. The front vehicle body of claim 6, wherein the dash tunnel upper end portion connection portion is defined as the dash cross member passes over an upper end portion of the dash tunnel reinforcement member, and the dash upper-upper end connection portion is defined as the dash cross member passes over an upper end portion of the dash upper side member.

8. The front vehicle body of claim 1, wherein the dash cross side member is connected to the dash cross member with a member lower end connection portion, connected to the side sill member with a side sill connection portion, and connected to the dash upper side member with a side sidewall connection portion.

9. The front vehicle body of claim 8, wherein the member lower end connection portion is defined as the dash cross member passes over an upper end portion of the dash cross side member.

10. The front vehicle body of claim 1, including:
a dash cross battery mounting member configured to connect the dash tunnel reinforcement member and the dash upper side member that connects the dash cross side member, the dash cross battery mounting member being configured as a battery mounting portion.

11. The front vehicle body of claim 10, wherein the dash cross battery mounting member is connected to the dash upper side member with a member first connection portion and connected to the dash tunnel reinforcement member with a member second connection portion.

12. The front vehicle body of claim 11, wherein the member first connection portion is located on a sidewall of the dash upper side member, and the member second connection portion is located on a sidewall of the dash tunnel reinforcement member.

13. The front vehicle body of claim 11, wherein a battery mounting reinforcement member is coupled to the dash cross battery mounting member.

14. The front vehicle body of claim 13, wherein the dash cross battery mounting member and the battery mounting reinforcement member define a battery mounting point.

15. The front vehicle body of claim 10, wherein the battery mounting portion is surrounded by a battery mounting part protection structure, and the battery mounting part protection structure is defined by the dash upper side member, the dash tunnel reinforcement member, and the dash cross battery mounting member.

16. The front vehicle body of claim 1, wherein the center side member, the center tunnel reinforcement member, and the seat cross member are connected to one another.

17. The front vehicle body of claim 1, wherein the front side member is provided to traverse an external engine compartment and connected to a front side of the dash upper side member.

18. The front vehicle body of claim 1,
wherein the dash tunnel reinforcement member and the center tunnel reinforcement member are located at a middle portion of a dash panel and divide a dash panel width into a left region and a right region, and
wherein the dash upper side member, the dash cross side member, a dash cross battery mounting member, the front side member, and the center side member are provided as dash panel left constituent components in the left region and dash panel right constituent components in the right region.

* * * * *